US011819971B2

(12) United States Patent
Shi et al.

(10) Patent No.: US 11,819,971 B2
(45) Date of Patent: Nov. 21, 2023

(54) WIND POWER BLADE MULTI-ROBOT COOPERATIVE GRINDING AND ROLLER COATING OPERATION ASSEMBLY LINE SYSTEM

(71) Applicant: REYDER (SHANGHAI) ROBOT TECHNOLOGY CO., LTD., Shanghai (CN)

(72) Inventors: Xiaohua Shi, Shanghai (CN); Yuehu Dong, Shanghai (CN); Boshi Zou, Shanghai (CN); Mingyang Li, Shanghai (CN); Xiaoli Zhang, Shanghai (CN)

(73) Assignee: Ruiyide (Shanghai) Robot Technology Co., Ltd, Shanghai (CN)

( * ) Notice: Subject to any disclaimer, the term of this patent is extended or adjusted under 35 U.S.C. 154(b) by 54 days.

(21) Appl. No.: 17/721,211

(22) Filed: Apr. 14, 2022

(65) Prior Publication Data

US 2023/0302600 A1    Sep. 28, 2023

(51) Int. Cl.
*B24B 19/14* (2006.01)
*B25J 11/00* (2006.01)

(52) U.S. Cl.
CPC ........... *B24B 19/14* (2013.01); *B25J 11/0065* (2013.01); *B25J 11/0075* (2013.01)

(58) Field of Classification Search
CPC .. B24B 5/01; B24B 5/02; B24B 7/188; B24B 19/14; B24B 21/16; B24B 41/068;
(Continued)

(56) References Cited

U.S. PATENT DOCUMENTS 9,272,382 B2 * 3/2016 Trnka ..................... B25J 5/02
11,752,518 B2 * 9/2023 Rock .................. B25J 15/0213
427/430.1

(Continued)

FOREIGN PATENT DOCUMENTS

| CN | 105252388 A | * | 1/2016 | ............. B24B 19/14 |
| CN | 111941211 A | * | 11/2020 | ............. B24B 19/14 |
| ES | 2371837 A1 | * | 1/2012 | ............. B23Q 1/527 |

OTHER PUBLICATIONS

Machine translation of ES-2371837-A1 (Year: 2012).*
Machine translation of CN-105252388-A (Year: 2016).*
Machine translation of CN-111941211-A (Year: 2020).*

*Primary Examiner* — Lee D Wilson
*Assistant Examiner* — Robert F Neibaur

(57) ABSTRACT

A wind power blade multi-robot cooperative grinding and roller coating operation assembly line system is provided and includes: a working platform; a blade tip transfer and tooling turning system and a blade root transfer and tooling turning system arranged on a middle of the working platform and configured to support and adjust a head and a tail of the wind power blade respectively; wind power blade automatic grinding robots and wind power blade automatic roller coating robots symmetrically arranged on the working platform and located on two sides of the wind power blade. An automatic processing of grinding and roller coating of wind power blades is realized, which can reduce labor intensity. An integration of omnidirectional transfer and weight of the wind power blades is realized, which can detect the weight in real-time. A blade sprain is avoided effectively, and a layout of an assembly line is more flexible.

5 Claims, 4 Drawing Sheets

(58) Field of Classification Search
CPC ..... B24B 41/067; B24B 41/007; B24B 41/02;
B24B 41/005; B24B 49/16; B23Q 1/25;
B23Q 1/40; B23Q 1/525; B23Q 1/527;
B23Q 1/76–766; B23Q 3/064; B23Q
3/126; B23Q 2240/007; B25J 11/0075;
B25J 11/0065
USPC .......................................................... 451/913
See application file for complete search history.

(56) References Cited

U.S. PATENT DOCUMENTS

| | | | |
|---|---|---|---|
| 2013/0178134 A1* | 7/2013 | Eriksen | B24B 19/26 |
| | | | 451/6 |
| 2015/0283665 A1* | 10/2015 | Heilig | B24B 19/14 |
| | | | 29/889.23 |
| 2022/0402219 A1* | 12/2022 | Chen | B29C 33/202 |

* cited by examiner

WIND POWER BLADE MULTI-ROBOT COOPERATIVE GRINDING AND ROLLER COATING OPERATION ASSEMBLY LINE SYSTEM

TECHNICAL FIELD

The disclosure relates to the field of wind power blade intelligent manufacturing technologies, in particular to a wind power blade multi-robot cooperative grinding and roller coating operation assembly line system.

DESCRIPTION OF RELATED ART

With the continuous development of intelligent manufacturing industries, an application field of robots is also expanded, and a wind power industry will make great progress under the promotion of intelligent manufacturing. As an important part of new energy, the wind power plays an irreplaceable role. However, a wind power blade (also referred to as wind turbine blade), as one of key core components of a whole wind turbine set, its manufacturing level represents the core competitiveness of related industries. For surface grinding and polishing, and roller coating process in the production of the wind power blade, there are still a large number of manual operations, and there is a lack of reasonable and efficient intelligent manufacturing solution. The manual grinding and roller coating process in current have the following deficiencies:

(1) At present, the grinding process requires multiple workers to work together. The manual method has the characteristics of large positioning randomness, difficult to control a grinding allowance and low production efficiency. In particular, the working environment is poor, the dust hazard in the grinding of the wind power blade is serious, thus workers must wear gas mask to work. The grinding effect is also easily limited by the state and operation proficiency of the workers.

(2) The roller coating process of the surface of the wind power blade is mainly manual, which inevitably leads to coating material waste, and inconvenient coating material thickness control. In addition, due to large amount of small molecular chemical paints in the coating material, operation stability is poor.

(3) For transfer of wind power blade among various processes, the cooperation between the worker and a forklift is high risk, especially the worker at a tail end turns universal wheels manually, if the communication between the worker and the forklift is inconvenient, it is very easy to damage the wind power blade. In addition, there are high hidden dangers of work safety.

The surface grinding and polishing, and the roller coating process in the production of the wind power blade has the characteristics of low efficiency, poor stability and high potential safety hazards.

Therefore, it is of great practical significance to develop a set of wind power blade multi-robot cooperative grinding and roller coating operation assembly line to liberate people from heavy and harsh working conditions.

SUMMARY OF THE DISCLOSURE

A purpose of the disclosure is to provide a wind power blade multi-robot cooperative grinding and roller coating operation assembly line, which is to provide a set of wind power blade multi-robot cooperative grinding and roller coating operation assembly line, which can perform the grinding, roller coating, weighing and other processes of the wind power blades efficiently and stably.

In order to solve at least one of the above technical problems, the disclosure adopts the following technical solutions.

The disclosure provides a wind power blade multi-robot cooperative grinding and roller coating operation assembly line system, includes: a working platform; a blade tip transfer and tooling turning system arranged on a middle of the working platform and configured to support and adjust an end of a wind power blade; a blade root transfer and tooling turning system arranged on the middle of the working platform and configured to support and adjust another end of the wind power blade; wind power blade automatic grinding robots symmetrically arranged on the working platform and located on two sides of the wind power blade; and wind power blade automatic roller coating robots symmetrically arranged on the working platform and located on the two sides of the wind power blade.

In an embodiment, the working platform is provided with robot horizontal moving tracks located on the two sides of the wind power blade.

In an embodiment, the blade root transfer and tooling turning system includes: a linkage transport flat A trolley (also referred to as first linkage transport flat trolley) arranged on the working platform; a first tooling lifting and buffer mechanism arranged on the linkage transport flat A trolley; and blade root turning tooling and blade root friction wheel turning devices arranged on the first tooling lifting and buffer mechanism.

In an embodiment, the first tooling lifting and buffer mechanism is provided with tooling locking mechanisms configured to position the blade root turning tooling; and the first tooling lifting and buffer mechanism is further provided with weight sensors (also referred to as load cells) configured to weigh the wind power blade.

In an embodiment, each of the wind power blade automatic grinding robots includes: a grinding robot chassis arranged on the robot horizontal moving track; a first lifting device arranged on the grinding robot chassis through a first rotation support device; a second telescopic device hinged on an upper end of the first lifting device; an opening angle of the second telescopic device being adjusted by a first telescopic device; a grinding angle adjusting mechanism and a constant force grinding mechanism arranged on an upper end of the second telescopic device; a dust suction device arranged on the second telescopic device; and a grinding robot hydraulic and power distribution system arranged on the grinding robot chassis.

In an embodiment, the blade tip transfer and tooling turning system includes: a linkage transport flat B trolley (also referred to as second linkage transport flat trolley) arranged on the working platform; a second tooling lifting and buffer mechanism arranged on the linkage transport flat B trolley; blade tip root turning tooling and blade tip friction wheel rotation adjusting devices arranged above the second tooling lifting and buffer mechanism.

In an embodiment, a structure of each of the wind power blade automatic roller coating robots is the same as that of each of the wind power blade automatic grinding robots, and each of the wind power blade automatic roller coating robots includes: a roller coating robot chassis arranged on a robot horizontal moving track, a second rotation support device arranged on the roller coating robot chassis, a roller coating angle adjusting mechanism and a curved surface roller coating mechanism arranged on the roller coating robot chassis through a second lifting device, a third telescopic device and a fourth telescopic device; and a roller coating robot hydraulic and power distribution system.

Compared with the related art, the beneficial technical effects of the disclosure: a structural design of the disclosure is reasonable, and the cooperative operation of multiple robots attached to a main assembly line is adopted, which can perform systematic operation for the grinding and roller coating process of wind power blades, realize automatic processing, reduce manual participation process, save labor cost and reduce labor intensity; omnidirectional transfer and weighing are integrated, which can detect the weight of the wind power blade in real time; through the synchronous adjustment of the front and rear active friction wheels, the corresponding working posture of the wind power blade is adjusted in real time, and the sprain of the wind power blade is effectively avoided; the linkage transport flat A trolley and B trolley can complete nine transfer actions, such as translation, lateral movement, right angle turning and in-situ rotation, which makes the layout of the assembly line more flexible and greatly improves the space occupation.

BRIEF DESCRIPTION OF THE DRAWINGS

The disclosure will be further described below in combination with the description of the accompanying drawings.

Figure 1:
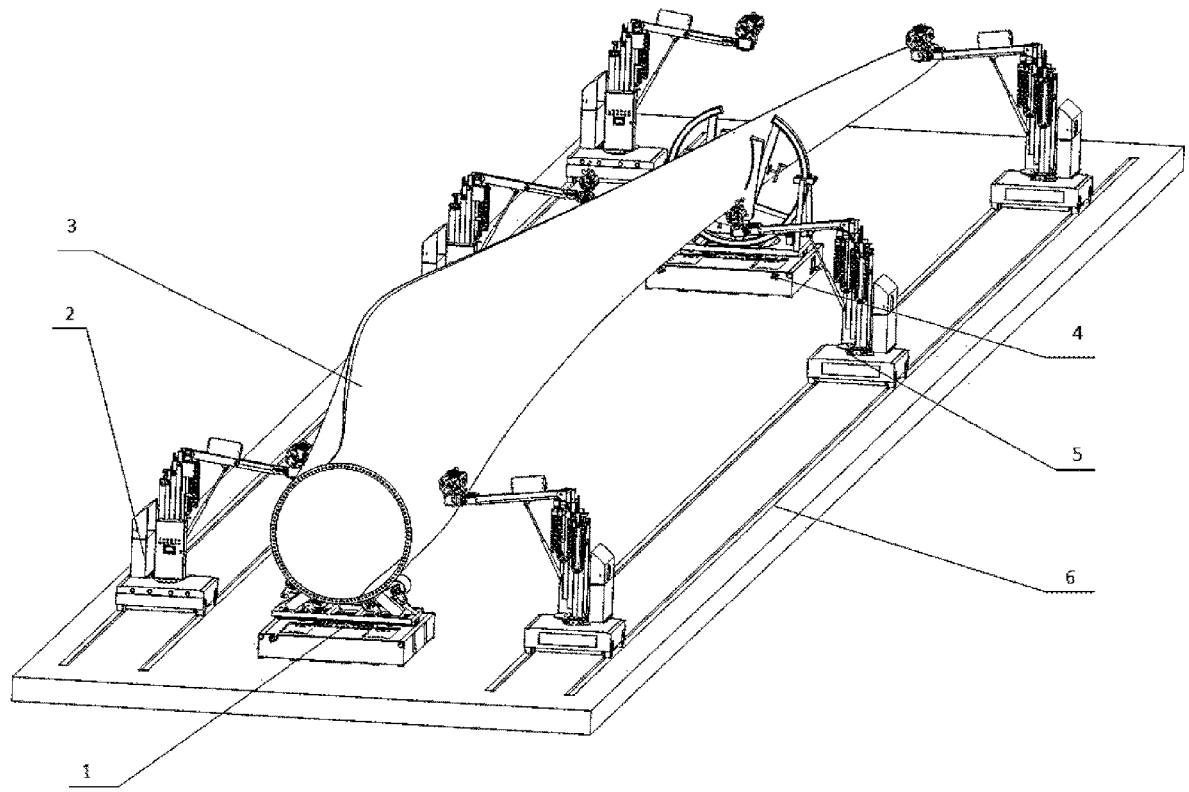
FIG. 1 illustrates a schematic stereogram of a wind power blade multi-robot cooperative grinding and roller coating operation assembly line system according to an embodiment of the disclosure.

DESCRIPTION OF REFERENCE NUMERALS 1. blade root transfer and tooling turning system; 11. linkage transport flat A trolley; 111. first tooling lifting and buffer mechanism; 1111. weight sensor; 1112. tooling locking mechanism; 1112a. ejector pin; 1112b. anti-rollover hook; 12. blade root turning tooling; 121. blade root friction wheel turning device; 2. wind power blade automatic grinding robot; 21. grinding robot chassis; 22. first rotation support device; 23. first lifting device; 24. first telescopic device; 25. grinding angle adjusting mechanism; 26. constant force grinding mechanism; 27. dust suction device; 28. second telescopic device; 29. grinding robot hydraulic and power distribution system; 3. wind power blade; 4. blade tip transfer and tooling turning system; 41. linkage transport flat B trolley; 411. second tooling lifting and buffer mechanism; 42. blade tip root turning tooling; 421. blade tip friction wheel rotation adjusting device; 5. wind power blade automatic roller coating robot; 51. roller coating robot chassis; 52. second rotation support device; 53. second lifting device; 54. third telescopic device; 55. roller coating angle adjusting mechanism; 56. curved surface roller coating mechanism; 57. fourth telescopic device; 58. roller coating robot hydraulic and power distribution system; 6. robot horizontal moving track.

DETAILED DESCRIPTION OF EMBODIMENTS

An embodiment of the disclosure discloses a wind power blade multi-robot cooperative grinding and roller coating operation assembly line system.

The wind power blade multi-robot cooperative grinding and roller coating operation assembly line system includes: a working platform, a blade tip transfer and tooling turning system 4, a blade root transfer and tooling turning system 1, wind power blade automatic grinding robots 2, and wind power blade automatic roller coating robots 5. The blade tip transfer and tooling turning system 4 is installed on a middle of the working platform and configured to support and adjust an end (also referred to as head end) of the wind power blade 3. The blade root transfer and tooling turning system 1 is installed on the middle of the working platform and configured to support and adjust another end (also referred to as tail end) of the wind power blade 3. The wind power blade automatic grinding robots 2 are symmetrically installed on the working platform and located on two sides of the wind power blade 3. The wind power blade automatic roller coating robots 5 are symmetrically installed on the working platform and located on the two sides of the wind power blade 3.

As shown in FIG. 1, two robot horizontal moving tracks 6 are symmetrically installed on the working platform and on the two sides of the wind power blade 3, in which the wind power blade automatic grinding robots 2 and the wind power blade automatic roller coating robots 5 are respectively installed at different positions corresponding to the wind power blade 3 on the robot horizontal moving tracks 6. Specifically, in this embodiment, the blade root transfer and tooling turning system 1 cooperates with the blade tip transfer and tooling turning system 4 to transfer the wind power blade 3 to a center line of a grinding and roller coating assembly line, and synchronously turn the wind power blade 3 to a suitable position for the process.

The robot horizontal moving tracks 6 are arranged on the two sides of the center line of the assembly line. Two or more wind power blade automatic grinding robots 2 arranged on one robot horizontal moving track are respectively responsible for the grinding operation of a blade root and a blade tip of the wind power blade, and the wind power blade automatic roller coating robot 5 is arranged on the same one robot horizontal moving track to complete the roller coating operation after the grinding. After the roller coating operation is completed, the weight sensor 1111 of a linkage transfer device completes the weighing process of the wind power blade, and then the wind power blade is transferred to a suitable position.

Figure 2A:
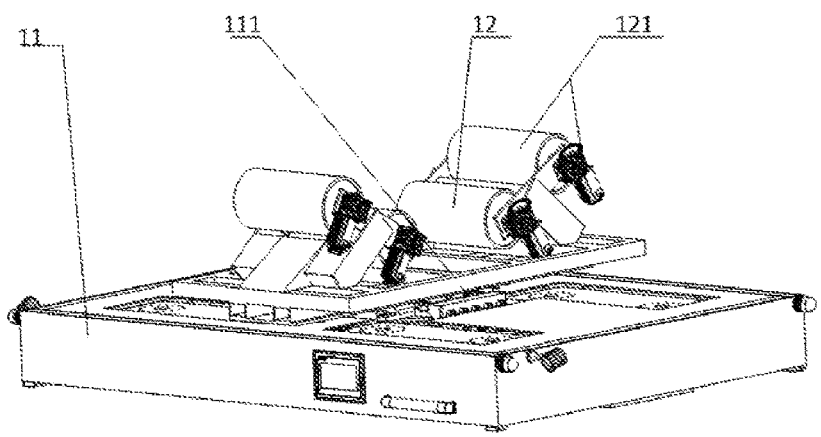
FIG. 2A and FIG. 2B illustrate schematic structural diagrams of a blade root transfer and tooling turning system according to the embodiment of the disclosure.
Figure 2B:
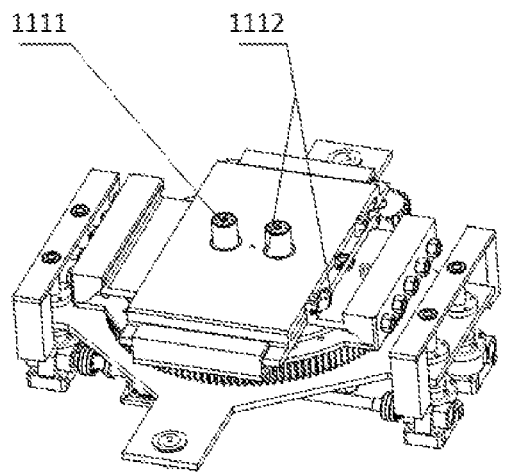

As shown in FIG. 2A and FIG. 2B, in this embodiment, the blade root transfer and tooling turning system 1 includes: a linkage transport flat A trolley 11 installed on the working platform, a first tooling lifting and buffer mechanism 111 installed on the linkage transport flat A trolley 11, blade root turning tooling 12 and blade root friction wheel turning devices 121 installed on the first tooling lifting and buffer mechanism 111.

Specifically, tooling locking mechanisms 1112 configured to position the blade root turning tooling 12 are installed on the first tooling lifting and buffer mechanism 111, and weight sensors 1111 configured to weigh the wind power blade 3 are also installed on the first tooling lifting and buffer mechanism 111. The wind power blade is weighed through the weight sensors 1111.

In the assembly line of this embodiment, the blade root transfer and tooling turning system 1 mainly includes: the linkage transport flat A trolley 11 and the blade root turning tooling 12, the first tooling lifting and buffer mechanism 111 of the linkage transport flat A trolley 11 includes the tooling locking mechanisms 1112 and the weight sensors 1111. An ejector pin 1112a of each of the tooling locking mechanisms 1112 is matched with a counterbore reserved on the blade root turning tooling 12, and an anti-rollover hook 1112b of each of the tooling locking mechanisms 1112 further locks the blade root turning tooling to complete the connection. The weight sensor 1111 is installed on a top of the ejector pin 1112a of the tooling locking mechanism 1112. When the wind power blade needs to be transferred, the weight sensor 1111 is squeezed by fitting with the bottom surface of the corresponding counterbore with the movement of the ejector pin, so as to complete the real-time weighing operation of the wind power blade 3.

In addition to its basic structure, the blade root turning tooling 12 mainly includes blade root friction wheel turning devices 121. The blade root friction wheel turning devices 121 will cooperate with the blade tip root turning tooling 42 to complete the morphological rotation of the wind power blade 3, so as to effectively reduce the twisting injury of the wind power blade during blade turning and avoid economic losses. The blade root friction wheel turning devices are symmetrical and are driven to rotate by a servo motor.

Figure 3:
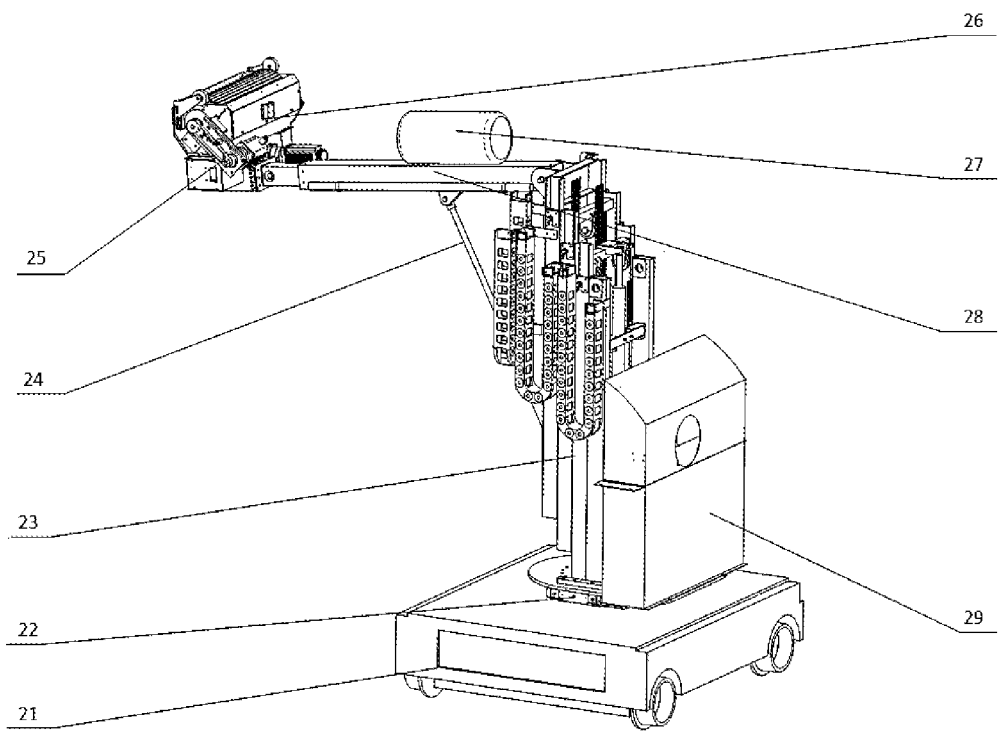
FIG. 3 illustrates a schematic structural diagram of a wind power blade automatic grinding robot according to the embodiment of the disclosure.

As shown in FIG. 3, the wind power blade automatic grinding robot 2 includes a grinding robot chassis 21 installed on the robot horizontal moving track 6, a first lifting device 23 installed on the grinding robot chassis 21 through a first rotation support device 22, a second telescopic device 28 hinged on an upper end of the first lifting device 23 and its opening angle being adjusted by a first telescopic device 24, a grinding angle adjusting mechanism 25 and a constant force grinding mechanism 26 installed on an upper end of the second telescopic device 28, a dust suction device 27 installed on the second telescopic device 28, and a grinding robot hydraulic and power distribution system 29 arranged on the grinding robot chassis 21.

In the assembly line of this embodiment, the first rotation support device 22 is fixed to a center of an upper end face of the grinding robot chassis 21 through bolt connection. The first lifting device 23 is welded and fixed above the first rotation support device 22 and close to a working surface of the wind power blade. The grinding robot hydraulic and power distribution system 29 is installed on a side far away from the working face of the wind power blade and above the first rotation support device 22 through bolt connection. A top of the first lifting device 23 is rotatably connected with the second telescopic device 28 through a pin shaft, and an opening and closing angle between the top of the first lifting device 23 and the second telescopic device 28 is adjusted by the first telescopic device 24. The grinding angle adjusting mechanism 25 is fixed on a tail plate at a protruding end of the second telescopic device 28 through bolts. The constant force grinding mechanism 26 is fixed with the grinding angle adjusting mechanism 25 through bolt connection. The dust suction device 27 is fixed to an outside of a guide rail outer pipe of the second telescopic device 28 by welding, the dust suction device 27 includes an exhaust pipe and a fan. The multi degree of freedom design of the wind power blade automatic grinding robot 2 will meet the grinding requirements of wind power blades in a small space, and the constant force automatic grinding mechanism 26 can widely adapt to various complex surfaces of wind power blades.

Figure 4:
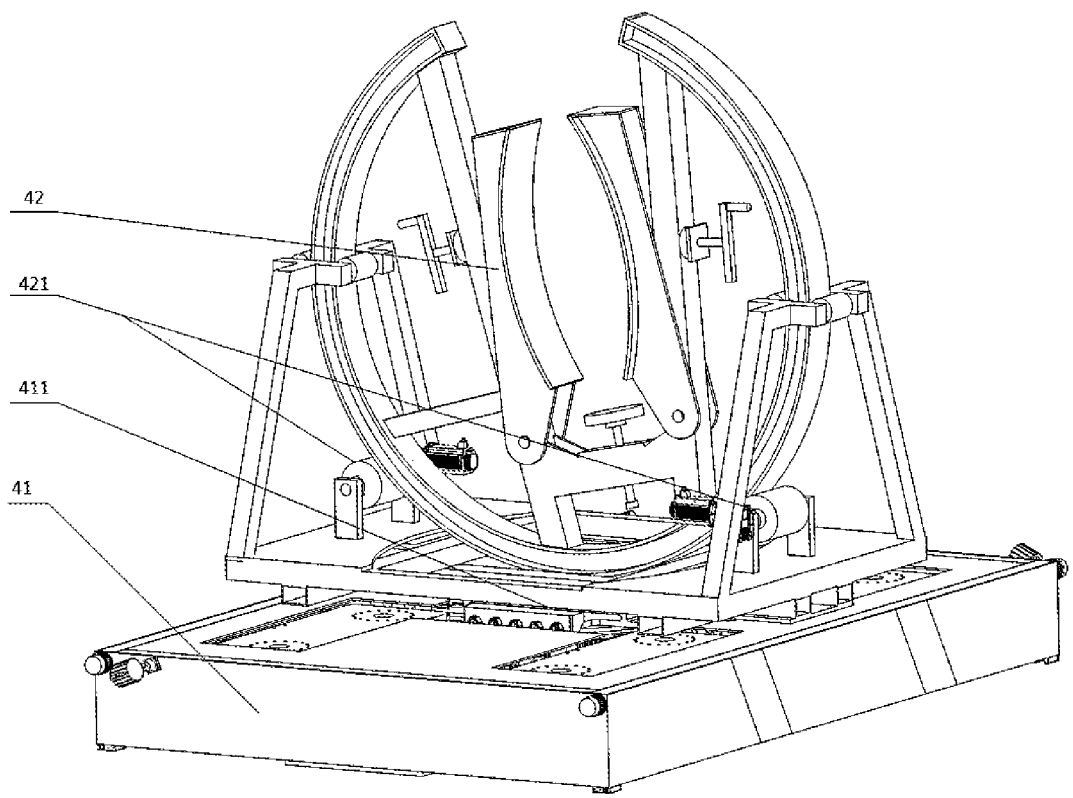
FIG. 4 illustrates a schematic structural diagram of a blade tip transfer and tooling turning system according to the embodiment of the disclosure.

As shown in FIG. 4, the blade tip transfer and tooling turning system 4 includes a linkage transport flat B trolley 41 installed on the working platform, a second tooling lifting and buffer mechanism 411 installed on the linkage transport flat B trolley 41, blade tip root turning tooling 42 and blade tip friction wheel rotation adjusting devices 421 installed above the second tooling lifting and buffer mechanism 411.

In the assembly line of this embodiment, the second tooling lifting and buffer mechanism 411 of the linkage transport flat B trolley 41 also includes tooling locking mechanisms and weight sensors, and its tooling locking principle and weighing principle are basically consistent with those of the linkage transport flat A trolley 11.

In addition to its basic framework, the blade tip root turning tooling 42 mainly includes blade tip friction wheel rotation adjusting devices 421, the blade tip friction wheel rotation adjusting devices 421 mainly directly rotate an outer ring of a blade tip eccentric fixing frame through the friction wheels, so as to indirectly and actively adjust the real-time state in the process of blade tip turning, so as to ensure that when the blade root turnover axis is not concentric with the blade tip turnover axis, the turning operation will cause the self-torsion of the wind turbine blade 3 as little as possible. A steering wheel mechanism is arranged on each of the linkage transport flat A trolley 11 and B trolley 41. Through the linkage of the two trolleys, nine transfer actions such as translation, lateral movement, right angle turning and in-situ rotation of the wind power blade can be completed, which is highly flexible.

Figure 5:
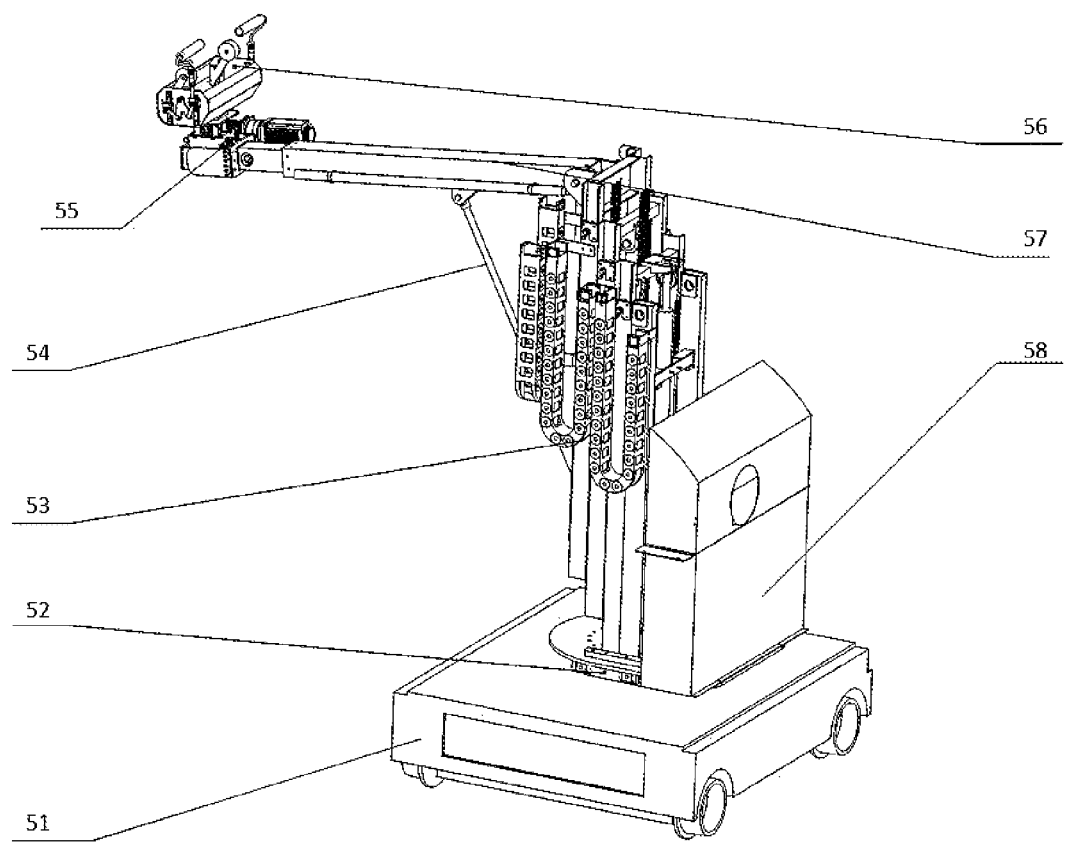
FIG. 5 illustrates a schematic structural diagram of a wind power blade automatic roller coating robot according to the embodiment of the disclosure.
Figure 6:
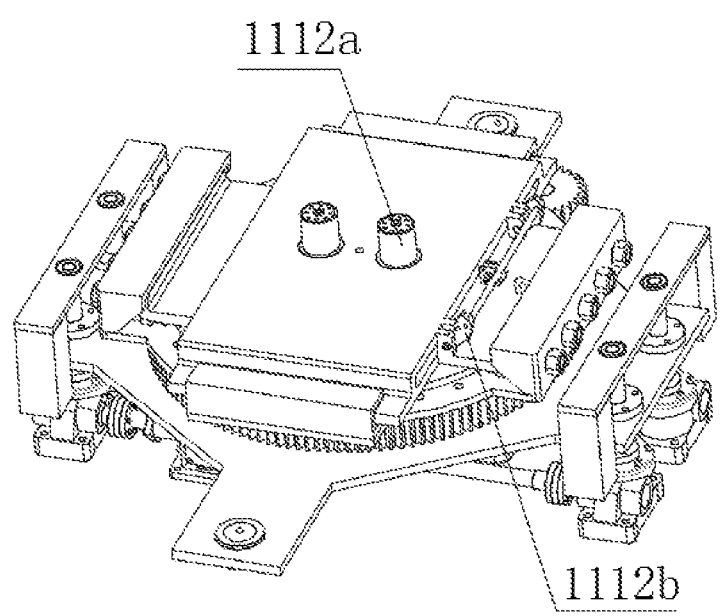
FIG. 6 illustrates a schematic structural diagram of a tooling locking mechanism according to the embodiment of the disclosure.

As shown in FIG. 5, the structure of the wind power blade automatic roller coating robot 5 is the same as that of the wind power blade automatic grinding robot 2. The wind power blade automatic roller coating robot 5 includes a roller coating robot chassis 51 installed on the robot horizontal moving track 6, a second rotation support device 52 installed on the roller coating robot chassis 51, a roller coating angle adjusting mechanism 55 and a curved surface roller coating mechanism 56 installed on the roller coating robot chassis 51 through a second lifting device 53, a third telescopic device 54 and a fourth telescopic device 57, and a roller coating robot hydraulic and power distribution system 58.

In the assembly line of this embodiment, the second rotation support device 52 is fixed at a center of an upper end face of the roller coating robot chassis 51 through bolt connection. The second lifting device 53 is welded and fixed above the second turning support unit 52 and on a side close to the working face of the wind power blade 3. The roller coating robot hydraulic and power distribution system 58 is installed above the second rotation support device 52 and on the side far away from the working face of the wind power blade 3 through bolt connection. The top of the second lifting device 53 is rotatably connected with the fourth telescopic device 57 through a pin shaft. An opening and closing angle of the above two are adjusted by the third telescopic device 54. The roller coating angle adjusting mechanism 55 is fixed on a tail plate at a protruding end of the fourth telescopic device 57 through bolts, and the curved surface roller coating mechanism 56 is fixed with the roller coating angle adjusting mechanism 55 through bolts. The roller coating mechanism of the wind power blade automatic roller coating robot 5 has an automatic feeding and spraying system and can adjust the flow in real time. A shaping roller device can conduct secondary shaping and roller coating on an uneven part of the primary roller coating to improve the product quality.

Working Principle of the Disclosure

First, the wind power blade automatic grinding robots 2 and the wind power blade automatic roller coating robots 5 are moved to the end of the robot horizontal moving tracks 6, and the wind power blade 3 is transferred to a vicinity of a center line of the assembly line by means of linkage, side movement and straight travel of the linkage transport flat A trolley 11 and B trolley 41. The blade root friction wheel turning devices 121 cooperate with the blade tip friction wheel rotation adjusting devices 421 to synchronously and actively complete the turning action of the wind power blade 3, and make it suitable for grinding and roller coating.

Then, the wind power blade automatic grinding robots 2 and the wind power blade automatic roller coating robots 5 enter the working area. The wind power blade automatic grinding robots 2 take the lead in grinding and dedusting the surface of the wind power blade 3. The wind power blade automatic roller coating robots 5 are responsible for roller coating the area after the grinding and dedusting. There can also only realize one of the grinding and the roller coating. After the processing of the wind power blade is completed, the weight sensors 1111 of the linkage transport trolleys transmit the real-time blade weighing data, and the blade root friction wheel turning devices 121 cooperate with the blade tip friction wheel rotation adjusting devices 421 to synchronously and actively turn the wind power blade 3 to the position with a lower center of gravity, which can reduce the potential safety hazards, and then the wind power blade 3*t* is transferred out of the assembly line.

In the description of the disclosure, it should be understood that the terms "longitudinal", "transverse", "upper", "lower", "front", "rear", "left", "right", "vertical", "horizontal", "top", "bottom", "inner", "outer" to indicate the azimuth or positional relationship based on the azimuth or positional relationship shown in the attached drawings, which is only for the convenience of describing the disclosure, rather than indicating or implying that the device or element must have a specific azimuth, be constructed and operated in a specific azimuth, so it cannot be understood as a limitation of the disclosure.

The above embodiments only describe the preferred mode of the disclosure and do not limit the scope of the disclosure. Without departing from the design spirit of the disclosure, various replacements and improvements made by those skilled in the art to the technical solutions of the disclosure shall fall within the protection scope determined by the claims of the disclosure.

What is claimed is:

1. A wind power blade multi-robot cooperative grinding and roller coating operation assembly line system, comprising:
    a working platform;
    a blade tip transfer and tooling turning system, arranged on a middle of the working platform and configured to support and adjust an end of a wind power blade;
    a blade root transfer and tooling turning system, arranged on the middle of the working platform and configured to support and adjust another end of the wind power blade; and
    wind power blade automatic grinding robots, symmetrically arranged on the working platform and located on two sides of the wind power blade; and
    wind power blade automatic roller coating robots, symmetrically arranged on the working platform and located on the two sides of the wind power blade;
    wherein the blade root transfer and tooling turning system comprises:
       a first linkage transport flat trolley, arranged on the working platform;
       a first tooling lifting and buffer mechanism, arranged on the first linkage transport flat trolley;
       blade root turning tooling and blade root friction wheel turning devices, arranged on the first tooling lifting and buffer mechanism;
       tooling locking mechanisms, arranged on the first tooling lifting and buffer mechanism and configured to position the blade root turning tooling; and
       weight sensors, arranged on the first tooling lifting and buffer mechanism and configured to weigh the wind power blade.

2. The wind power blade multi-robot cooperative grinding and roller coating operation assembly line system according to claim 1, further comprising:
    robot horizontal moving tracks, arranged on the working platform and located on the two sides of the wind power blade.

3. The wind power blade multi-robot cooperative grinding and roller coating operation assembly line system according to claim 2, wherein each of the wind power blade automatic grinding robots comprises:
    a grinding robot chassis, a rotation support device, a lifting device, a first telescopic device, a grinding angle adjusting mechanism, a constant force grinding mechansim, a duct suction device, a second telescopic device, and a grinding robot hydraulic and power distribution system;
    wherein the grinding robot chassis is arranged on one of the robot horizontal moving tracks; the lifting device is arranged on the grinding robot chassis through the rotation support device; the second telescopic device is hinged on an upper end of the lifting device, and an opening angle of the second telescopic device is adjusted by the first telescopic device; the grinding angle adjusting mechanism and the constant force grinding mechanism are arranged on an upper end of the second telescopic device; the dust suction device is arranged on the second telescopic device; and the grinding robot hydraulic and power distribution system is arranged on the grinding robot chassis.

4. The wind power blade multi-robot cooperative grinding and roller coating operation assembly line system according to claim 1, wherein the blade tip transfer and tooling turning system comprises:
    a second linkage transport flat trolley, arranged on the working platform;
    a second tooling lifting and buffer mechanism, arranged on the second linkage transport flat trolley; and
    blade tip root turning tooling and blade tip friction wheel rotation adjusting devices, arranged above the second tooling lifting and buffer mechanism.

5. The wind power blade multi-robot cooperative grinding and roller coating operation assembly line system according to claim 1, wherein the wind power blade automatic roller coating robots and the wind power blade automatic grinding robots have a same structure, and each of the wind power blade automatic roller coating robots comprises:
    a roller coating robot chassis, a rotation support device, a lifting device, a first telescopic device, a second telescopic device, a roller coating angle adjusting mechanism, a curved surface roller coating mechanism, and a roller coating robot hydraulic and power distribution system; and wherein the roller coating robot chassis is arranged on a robot horizontal moving track, the rotation support device is arranged on the roller coating robot chassis, the roller coating angle adjusting mechanism and the curved surface roller coating mechanism are arranged on the roller coating robot chassis through the lifting device, the first telescopic device and the second telescopic device.

\* \* \* \* \*